US008966599B1

(12) United States Patent
Barrows et al.

(10) Patent No.: US 8,966,599 B1
(45) Date of Patent: Feb. 24, 2015

(54) AUTOMATIC TOKEN RENEWAL FOR DEVICE AUTHENTICATION

(71) Applicant: Amazon Technologies, Inc., Reno, NV (US)

(72) Inventors: Maximilian Francis Barrows, Seattle, WA (US); Paul Francis Dean Ferraro, Seattle, WA (US); Jason George Mchugh, Seattle, WA (US); Abraham Martin Passaglia, Seattle, WA (US); Andrew Jay Roths, Seattle, WA (US); Eric Allan Shell, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/830,877

(22) Filed: Mar. 14, 2013

(51) Int. Cl.
*G06F 7/04* (2006.01)
*H04L 29/06* (2006.01)

(52) U.S. Cl.
CPC .................................... *H04L 63/08* (2013.01)
USPC ........ 726/6; 726/9; 726/7; 713/156; 713/155; 713/189; 713/172; 705/37

(58) Field of Classification Search
CPC ........ H04L 9/32; H04L 9/3234; H04L 9/3213
USPC ...................... 726/6, 9, 28; 713/156, 172, 189
See application file for complete search history.

(56) References Cited

U.S. PATENT DOCUMENTS

| | | | | |
|---|---|---|---|---|
| 7,734,527 B2 * | 6/2010 | Uzo | ................................ | 705/37 |
| 8,245,048 B2 * | 8/2012 | Chai et al. | ..................... | 713/181 |
| 8,245,052 B2 * | 8/2012 | Bjorn | ........................... | 713/186 |
| 8,341,714 B2 * | 12/2012 | Muller et al. | ..................... | 726/9 |
| 8,453,218 B2 * | 5/2013 | Lan et al. | ........................... | 726/4 |
| 8,683,196 B2 * | 3/2014 | Fu et al. | ........................... | 726/9 |
| 8,707,405 B2 * | 4/2014 | O'Donnell et al. | ................ | 726/6 |
| 8,788,835 B2 * | 7/2014 | Cook et al. | .................... | 713/184 |
| 2009/0064294 A1 * | 3/2009 | Cook et al. | ........................ | 726/6 |
| 2009/0217033 A1 * | 8/2009 | Costa et al. | .................... | 713/155 |
| 2012/0030472 A1 * | 2/2012 | Chai et al. | ..................... | 713/181 |
| 2012/0131354 A1 * | 5/2012 | French | .......................... | 713/189 |
| 2012/0159140 A1 * | 6/2012 | Chang et al. | ....................... | 713/2 |
| 2012/0210445 A1 * | 8/2012 | Omernick et al. | ............... | 726/28 |
| 2013/0007856 A1 * | 1/2013 | Bennett et al. | ..................... | 726/6 |
| 2013/0024927 A1 * | 1/2013 | Patil et al. | ......................... | 726/9 |
| 2013/0179952 A1 * | 7/2013 | O'Donnell et al. | ............... | 726/6 |
| 2014/0007208 A1 * | 1/2014 | Faludi | ................................ | 726/7 |

OTHER PUBLICATIONS

Aloul F, Two factor authentication using mobile phones, May 2009, IEEE, vol. 6, pp. 641-644.*

* cited by examiner

*Primary Examiner* — Dede Zecher
*Assistant Examiner* — Viral Lakhia
(74) *Attorney, Agent, or Firm* — Novak Druce Connolly Bove + Quigg LLP

(57) ABSTRACT

Approaches are described for automatically generating new security credentials, such as security tokens, which can involve automatically re-authenticating a user (or client device) using a previous security token issued to that user (or device). The re-authentication can happen without any knowledge and/or action on the part of the user. The re-authentication mechanism can invalidate and/or keep track of the previous security token, such that when a subsequent request is received that includes the previous security token, the new security token can be invalidated, and the user caused to re-authenticate, as receiving more than one request with the previous security token can be indicative that the user's token might have been stolen.

24 Claims, 9 Drawing Sheets

AUTOMATIC TOKEN RENEWAL FOR DEVICE AUTHENTICATION

BACKGROUND

People are performing an increasing number and variety of tasks electronically. Many of these tasks involve sending requests to resources available across a network, such as the Internet. In order to ensure that a request is submitted by a user authorized to access a resource, or specific actions or data available through those resources, the user submitting the request often has to be authenticated to a system providing the resource. In many cases, this involves a user providing some type of credential, such as a username and password pair. In order to prevent the user from repeatedly having to enter these credentials, and the system or service from repeatedly having to validate these credentials, a token can be created for the user that can be provided with subsequent requests on a user session. When the system receives a request with a valid token for a particular user, the system can proceed to process the request. A potential downside to such an approach, however, is that any third party obtaining a copy of the token can also submit requests that appear to be valid requests from the user based on the token being included.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches to managing security in an electronic environment. In particular, various embodiments provide for automatically generating new security credentials, such as security tokens, which can involve automatically re-authenticating a user (or client device) using a previous security token issued to that user (or device). The re-authentication can happen without any knowledge and/or action on the part of the user. The re-authentication mechanism can invalidate and/or keep track of the previous security token, such that when a subsequent request is received that includes the previous security token, the new security token can be invalidated, and the user caused to re-authenticate, as receiving more than one request with the previous security token can be indicative that the user's token might have been stolen.

For example, in accordance with an embodiment, when a user provides authenticating credentials (e.g., a user name and password) from a particular client device, the user is issued a security token to be used with subsequent requests. Upon receiving a request from the user including the security token, information for the security token can be analyzed to determine whether the security token has expired, or at least has passed a valid lifetime. If the security token has expired, a new security token can be generated and issued to the user if it is determined that a new security token has not already been generated. In the situation where a new security token has been generated, receipt of the new security token confirmed, and a grace period for receiving the previous security token expired, all tokens that exist for that user and/or device can be invalidated, the client device deregistered, and the user (i.e., the proper owner) forced to re-register the device and/or re-authenticate by providing any of various types of credentials.

Various other functions and advantages are described and suggested below as may be provided in accordance with the various embodiments.

Figure 1:
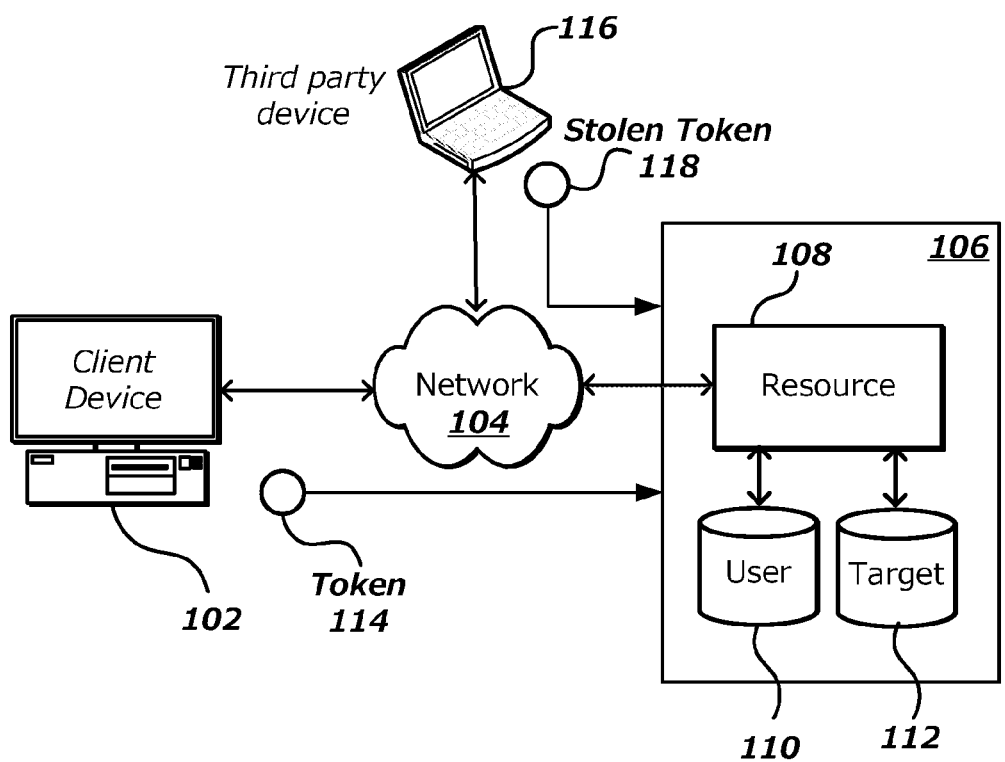
FIG. 1 illustrates an example environment in which aspects of the various embodiments can be implemented.

FIG. 1 illustrates an example environment in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

As mentioned above, it is often the case that such a provider will want to authenticate an identity of the user causing a request to be submitted from a client device 102 in order to control who as access to one or more resources 108 available through the provider environment. The provider also might want to authenticate a user before granting access to data stored in one or more data stores 110, 112 that might be a target of the request. Authentication typically identifies the user causing the request and the specific device identify. A user can provide any of various types of credentials in order to authenticate an identity of the user and device to the provider. These credentials can include, for example, a username and password pair, biometric data, a digital signature, or other such information. The provider can validate this information against information stored for the user, and if valid can determine to process the request.

Once a user is authenticated, a user session can be initiated on the provider environment 106 in at least some embodiments. A component of the provider environment can generate a security credential, such as a security token, and can provide that security token to the client device 102. The security token can be associated with a time interval during which the security token is valid, and upon expiration of the time interval the security token will be considered to be expired. The requests and returning information (such as security tokens, delivery receipts, etc.) can be communicated through the network using a guaranteed device messaging framework or other such framework, and the provider environment can keep track of which security tokens have been issued and/or receipt acknowledgements per client device by storing such information in persistent storage.

When the client device submits a subsequent request, the client device 102 can cause a copy of the security token 114 to be submitted with the request (or at least associated with the request). When a component of the provider environment 106 receives the request, the component can analyze the security token to ensure that the security token includes valid information (e.g., the security token is signed and encrypted by the provider system) and has not expired, and if so can cause the request to be processed.

For example, in at least some embodiments, the security token can be signed and encrypted by the provider system, e.g., the token can be a cryptographically secure token. The user or client device generally will be unable to decrypt the security token, and will not have any idea what is in the security token or how the information is formatted. The signature also can include at least one integrity check to ensure that the signature has not been tampered with. When a request is received that includes the security token, the provider system or service can decrypt the security token and check the signature to obtain session information that the system trusts as being valid. The session information can include session credentials, such as an access key identifier, resource-specific information, or other such credentials, that enable a user to obtain access to certain resources or functionality.

A potential downside to such an approach, however, is that any person or component having access to a copy of the security token can also potentially impersonate that user. For example, a third party user accessing a copy of the security token at a third party device 116 can cause requests to be submitted that include a copy of the security token 118, such that the resource provider environment may determine that the request is a valid request from the user on the session and may process the request. In this situation, the third party can continue to impersonate the user until the user realizes that someone has stolen their identity. At that point, the user can contact customer service or use some self-service interface to invalidate the security token. However, this can be an expensive operation and also a bottleneck for scaling since it requires all back-end servers to communicate with a central location to determine whether the security token is valid. As such, not only do customers have to recognize when someone has stolen their security token, the architecture to support the invalidation along with determining whether the security token is valid does not scale.

In at least some embodiments, usage of a hardware security module is one way to ensure that the user or device identity is secured. However, this requires a non-trivial cost in manufacturing a device. Accordingly, approaches in accordance with various embodiments can increase the difficulty in impersonating a user by providing a system for automatically generating new security credentials, such as security tokens, which can involve automatically re-authenticated a user (or client device) using a previous security token issued to that user (or device). The re-authentication mechanism can invalidate and/or keep track of the previous security token, such that when a subsequent request is received that includes the previous security token, the new security token can be invalidated, and the user caused to re-authenticate, as receiving more than one request with the previous security token can be indicative that the user's token might have been stolen. Accordingly, in this situation, all security tokens that exist for that user and/or device are invalidated, the client device deregistered, and the user (i.e., proper owner) forced to re-register and/or re-authenticate by providing any of various types of credentials (such as username and password) to the provider environment. Re-authentication in this manner advantageously provides for a scalable solution since the check with the back-end server as to whether the security token is valid is performed infrequently, and the less resource intensive determination as to whether multiple request use the same security token for re-authentication can be performed instead.

Figure 2:
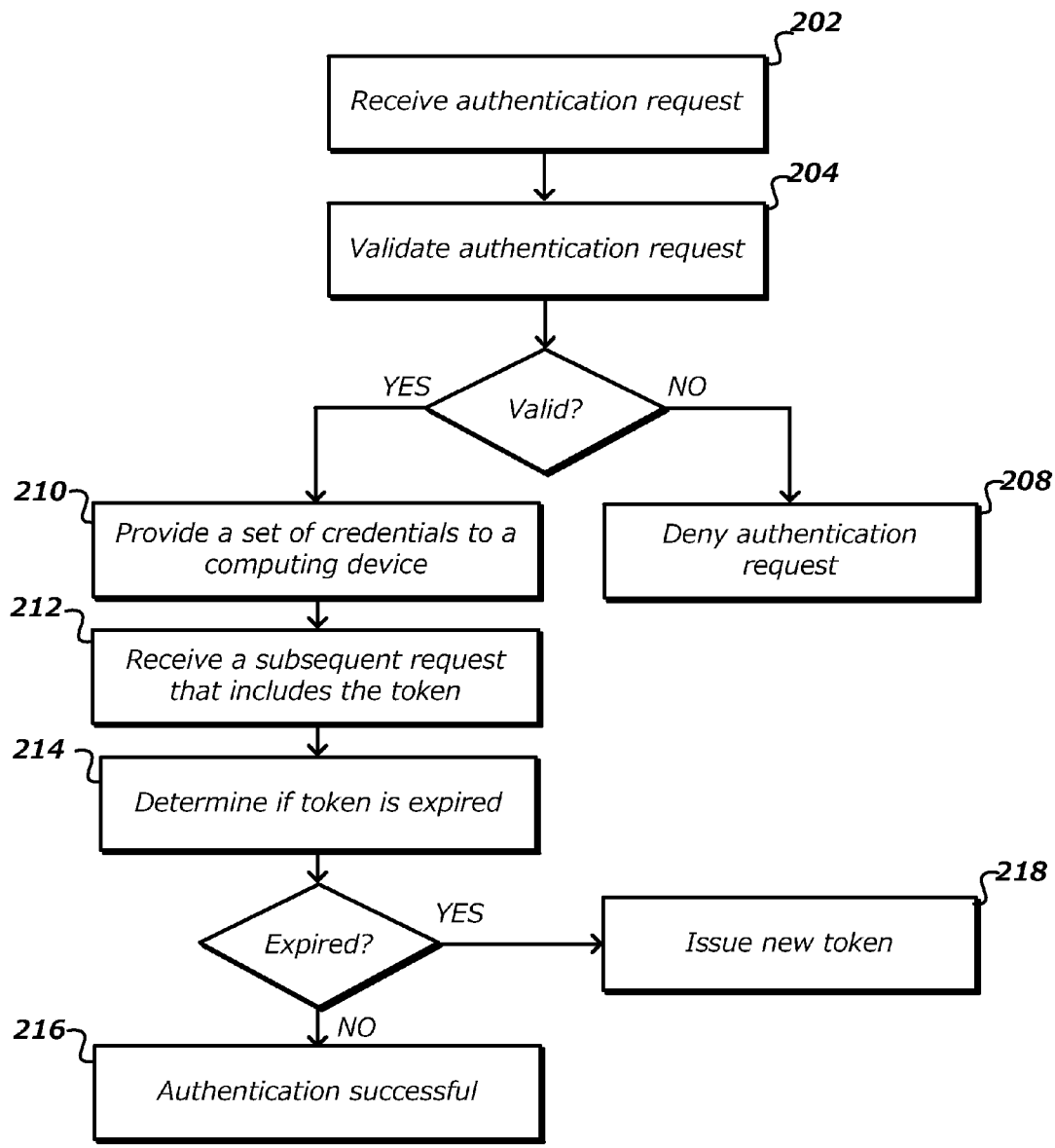
FIG. 2 illustrates an example process for authenticating a user (or client device), in accordance with an embodiment.

FIG. 2 illustrates an example process for authenticating a user (or client device), in accordance with an embodiment. It should be understood that, for any process described herein, that there can be additional or fewer steps performed in similar or alternative orders, or in parallel, within the scope of the various embodiments unless otherwise stated. An authentication request is received 202 that includes information useful in authenticating a user (or client device). This request can be received, for example, in response to a user entering username and password information into a Web page and selecting a "submit" or similar option, causing the request to be submitted. The information submitted by the user can be analyzed and the authentication request validated 204, such as by comparing the username and password combination to a set of username-password pairs stored in a data store for a resource or content provider. If the authentication request is not validated, such as where the request is determined to not correspond to a stored username-password pair with access to one or more resources needed to process the request, the request can be denied 208. If the request authentication is validated, a security credential, such as a security token, is provided 210 to the client device for submission with any subsequent requests. The security token can be used by the providing environment to authenticate the user instead of having the user provide identifying credentials (i.e., a user name and password) each time the user requests access to certain resources or functionality of the resource providing environment.

When a subsequent request is received 212 at the provider environment, the environment determines 214 whether the security token contains valid or expected information, as well as whether the security token has expired (i.e., needs to be renewed). Determining that the token includes valid security information can include verifying a validity and integrity of a signature of the token. As described above, the security token can be associated with a time interval (e.g., seven days or some other time interval) during which the security token is active, and upon expiration of the time interval the security token needs to be renewed at least within a renewal period or window (such as fourteen days). In accordance with an embodiment, different time intervals are possible. For example, one user might be associated with a security token that needs to be renewed every seven days while another user might be associated with a security token that needs to be renewed every three hours. In other embodiments, user's associated with a particular geographic region and/or specific tasks or resource can be associated with a security token corresponding to a time interval based at least on the geographic region and/or specific tack or service.

In response to determining that the security token contains valid information and does not need to be renewed, no other authentication checks need to be performed and the user (or client device) is authenticated 216. If it is determined that the security token contains valid information but needs to be renewed, a new security token can be issued 218 to the client device. For example, upon receiving a request from the user that includes the security token (i.e., an expired security token), the provider environment can automatically re-authenticate the user and provide the user with a new security token. Thereafter, when a malicious user attempts to authenticate using the same security token, the provider environment identifies that two separate requests using the same previously-valid security token have been received and invalidates all security tokens that exist for that user and/or client device and deregisters the client device. The user would then be forced to re-register the device and/or re-authenticate by providing any various types of credentials.

In accordance with an embodiment, there might be some amount of communication delay between issuing a security token by the provider environment, receiving an acknowledgment that the security token has been received at the provider environment, and receiving a subsequent request at the provider environment. For example, in the time between issuing a security token, receiving an acknowledgment, and receiving a subsequent authentication request, a user might move to a different time zone, move to a different location, connect through a different network, disable their device, etc. In at least some embodiments it may be undesirable to have a user resubmit credentials any time the user performs any of these or similar actions during a session. Accordingly there can be some allowances made for delays in issuing and processing security tokens.

Figure 3:
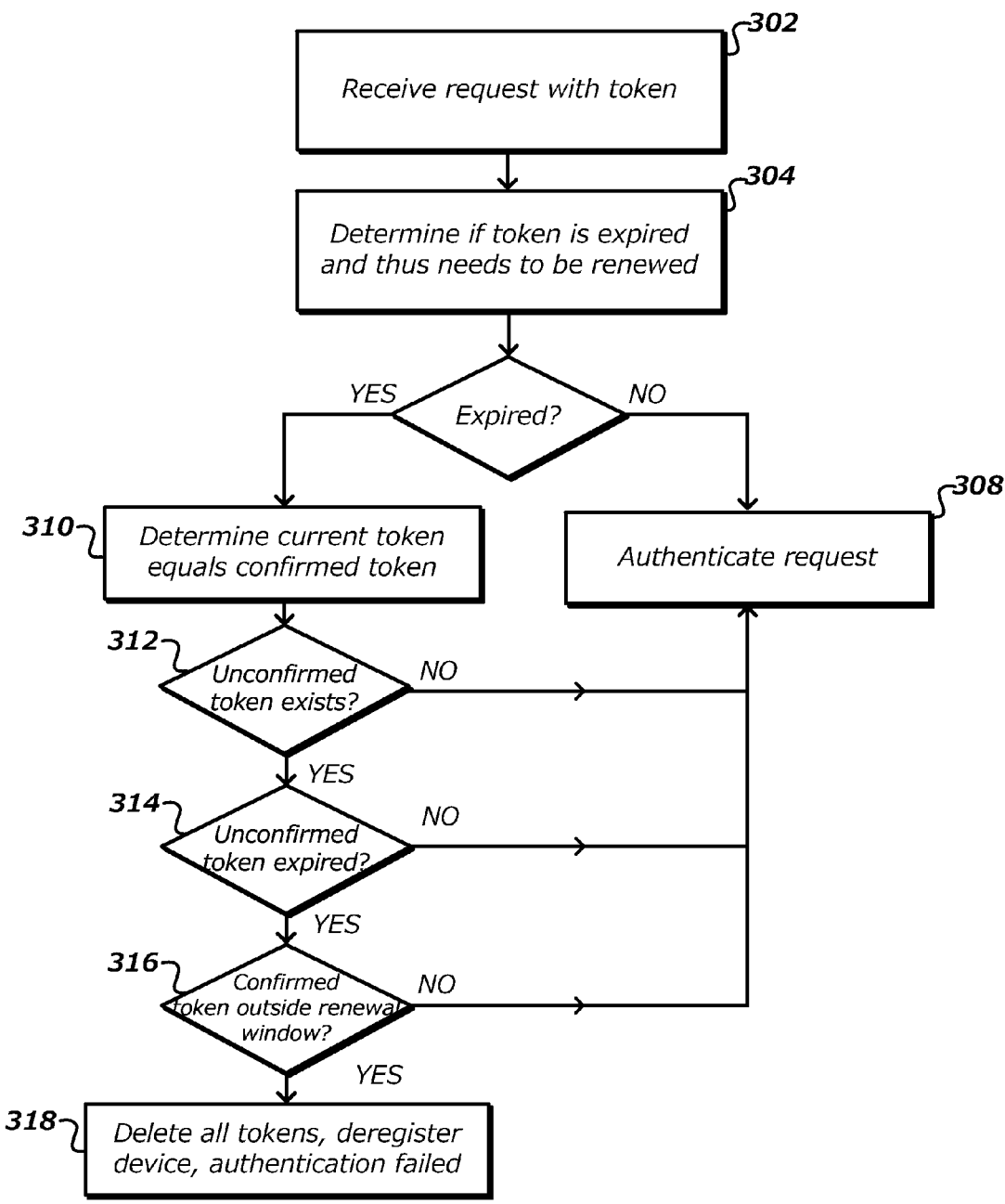
FIG. 3 illustrates an example process for authenticating a user (or client device), in accordance with various embodiments.

FIG. 3 illustrates an example process for authenticating a user (or client device), where although a new security token has been issued to the user (or client device), the user has submitted a request using an old security token. To assist in understanding the embodiments described herein, Table 1, which displays security token state information, is being provided.

TABLE 1

| States | Device Account ID | Confirmed Token | Previous Token | Unconfirmed Token |
|---|---|---|---|---|
| Unregistered | (No data present) | | | |
| Non-Expired Token | 1234XYZ | Token-A | NULL | NULL |
| New Token Issued | 1234XYZ | Token-A | NULL | Token-B |
| New Token Confirmed | 1234XYZ | Token-B | Token-A | NULL |
| New Token Issued | 1234XYZ | Token-B | Token-A | Token-C |
| New Token Confirmed | 1234XYZ | Token-C | Token-B | NULL |

Referring to Table 1, by way of example, for each client device registered with a provider environment, a device account ID is created. As displayed in Table 1, an unregistered device has no associated data. The device account ID identifies a client device registered with a resource provider environment. For illustration purposes, Table 1 displays only one device account ID, but other devices can be registered with the provider environment. The following information can be stored in persistent storage for the device account ID: the device account ID, confirmed token information, previous token information, and unconfirmed token information. The device account ID indicates the particular client device. The confirmed token includes information that indicates the current confirmed token for the client device. The previous token includes information that indicates the previous confirmed token for the client device, where the previous token is NULL when a token is the first token issued for the client device since authenticating the device. Unconfirmed token includes information that indicates that a new token has been issued for the current token, but has not been confirmed by the client device. The unconfirmed token will be NULL except for the period of time between issuing a token and when the token is confirmed.

Returning to FIG. 3, a request including token-A is received 302 at the provider environment, where upon receiving the request, the environment determines 304 whether token-A contains valid or expected information, as well as whether the token has expired (i.e., needs to be renewed). As described above, the token can be associated with a time interval during which the token is active, and upon expiration of the time interval the token is considered expired. In the instance where token-A contains valid information and has not expired, the user (or client device) is authenticated 308, and the client device can access the one or more resources available through the provider environment. In the instance where token-A contains valid information but has expired, for example, the time interval (e.g., as seven days) during which the token is active has elapsed, the provider environment will automatically re-authenticate the user (or client device) and provide token-B (unconfirmed) to the client device.

Token-B remains unconfirmed until an acknowledgment is received from the client device that confirms that the client device received token-B. Accordingly, as displayed in Table 1, token-A is confirmed, the previous token is NULL, and issued token-B is unconfirmed. As described above, there might be some amount of communication delay between issuing token-B and receiving an acknowledgment that token-B has been received, and in that time, the client device might submit a request using token-A (instead of token-B). This can occur, for example, when token-B is never received by the client device. In this situation, in response to determining 310 that the current token (i.e., token-A) is the same as the confirmed token (i.e., token-A), the provider environment determines 312 whether an unconfirmed token exists.

In the case where no unconfirmed token exists, the user (or the client device) is authenticated and can access the one or more resources available through the provider environment. In the situation where the unconfirmed token exists, the provider environment determines 314 whether the unconfirmed token contains valid or expected information, as well as whether the token has expired. That is, whether token-B issued within a grace period such as within a predetermined period of time (e.g., one day). If so, the provider environment will continue to accept the previous confirmed token (i.e., token-A) during the grace period. In accordance with an embodiment, the provider environment can determine whether the unconfirmed token exists by querying the persistent storage for a record of the unconfirmed token. If a record is located, then it is determined that the unconfirmed token exists.

In the instance where unconfirmed token-B issued outside the grace period (e.g., one day), the provider environment determines 316 whether the previous confirmed token (i.e., token-A) contains valid or expected information, as well as whether the token is older than a renewal window (e.g., fourteen days). In the instance where the confirmed token-A is less than fourteen days old, the user (or client device) is authenticated, and the client device can access the one or more resources available through the provider environment. Additionally, the provider environment asynchronously issues and provides a new token to the client device, as further described in FIG. 4.

In the instance where confirmed token-A contains valid or expected information, as well as is older than fourteen days, the provider environment invalidates all tokens that exist for that user and/or client device, deregisters the client device, and authentication fails 318. The user would then be forced to re-register the device and/or re-authenticate by providing any various types of credentials. In accordance with an embodiment, this advantageously ensures that an attacker with a stolen token cannot continue to use the token indefinitely in the instance where the actual device is turned off or has no network connection for an extended period of time.

Figure 4:
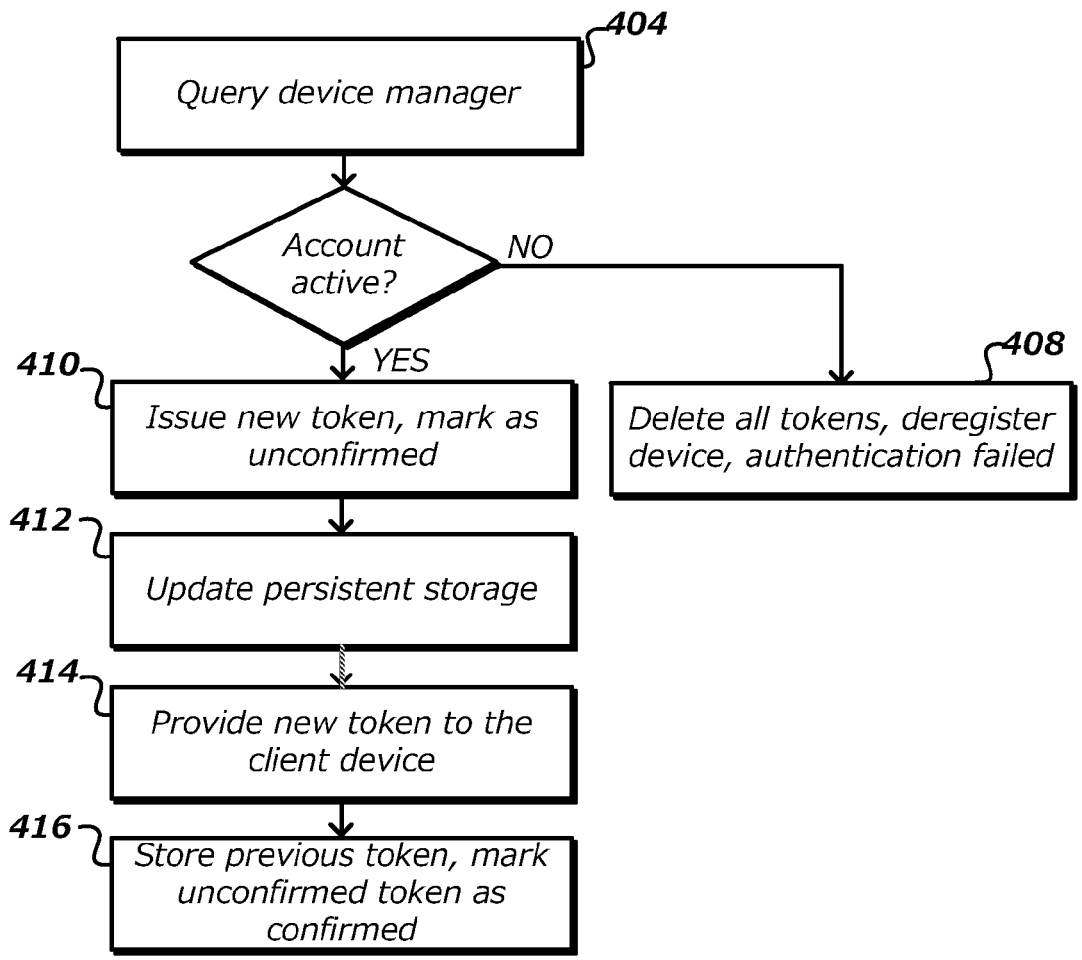
FIG. 4 illustrates an example process for issuing a replacement token, in accordance with an embodiment.

FIG. 4 illustrates an example process for authenticating a user (or client device), where a replacement token is provided to the client device, in accordance with various embodiments. As described in step 316 of FIG. 3, it was determined that token-B was not successfully delivered to the client device (e.g., due to a network outage), where this determination trigged an asynchronous process, whereby a new token was issued and provided to the client device. Additionally, during that process, a device manager is queried 404 to determine whether token-A (i.e., the previously authenticated token) contains valid or expected information and is otherwise active.

In accordance with an embodiment, the device manager can maintain the status (e.g., active, closed, suspended, etc.) of each device account ID registered with the provider environment. Accordingly, if it is determined 408 that the client device is no longer active, or some other error or issue is apparent with the client device, the provider environment invalidates all tokens that exist for that user and/or client device, deregisters the client device, and authentication fails. If it is determined that the client device is active, then a new token is issued 410, provided to the client device, and marked as unconfirmed. For example, unconfirmed token-B can be issued to the client device, and the persistent storage can be updated 412 to take note that unconfirmed token-B was issued. It should be noted that in some embodiments, the new token can be any new token, such as unconfirmed token-D, and that unconfirmed token-B is just one example of a token that can be issued. Thereafter, token-B is provided 414 to the client device, and once an acknowledgment confirming receipt of token-B is received at the provider environment, the persistent storage is updated 416. For example, as shown in column 'New Token Confirmed' of Table 1, confirmed token is updated to token-B, previous token is updated to token-A, and unconfirmed token is updated to NULL.

Figure 5:
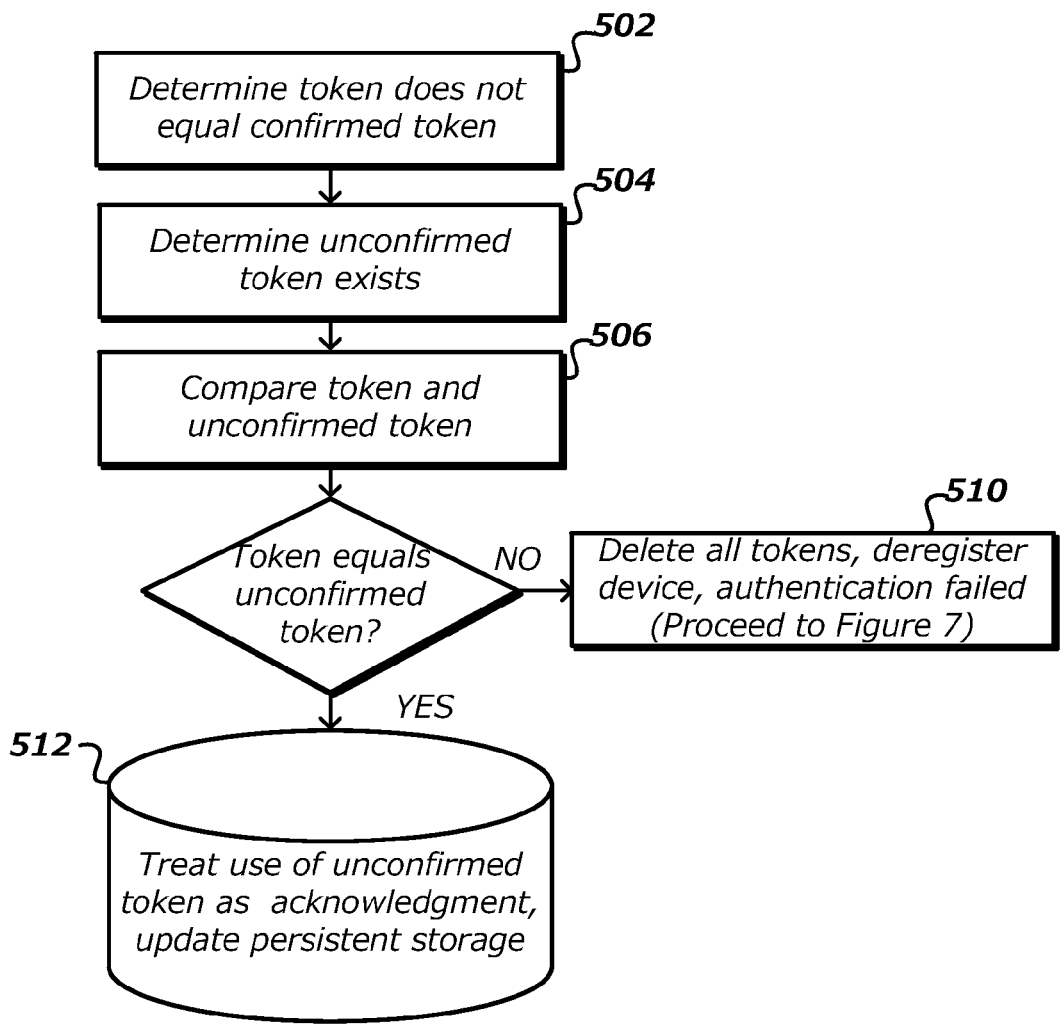
FIG. 5 illustrates an example process for using a newly issued token before an acknowledgement is received at a provider environment that the client device received the token.

FIG. 5 illustrates an example process for authenticating a user (or client device), where a newly issued token is used before an acknowledgement confirming receipt of the newly issued token is received at the provider environment, in accordance with an embodiment. In this situation, the provider environment determines 502 that the token being used (i.e., unconfirmed token-B) does not equal the confirmed token-A.

Upon determining 504 that the unconfirmed token exists, the provider environment compares 506 the received token (i.e., unconfirmed token-B) to the last unconfirmed token stored in persistent storage (i.e., token-B). In an embodiment, determining that unconfirmed token-B exists can include searching the persistent data storage for an entry indicating the issuing of token-B to the client device. In the situation where the token being used (i.e., unconfirmed token-B) does not match the unconfirmed token, the provider environment invalidates all tokens that exist for that user and/or client device, deregisters the client device, and authentication fails 510. In some instances, the user or some other third party might attempt to authenticate using an invalidated token of step 510 (or some other unauthorized token). The manner in which this situation is dealt with is described with respect to FIG. 7.

In the situation where the token being used matches the unconfirmed token, the match can be treated as an acknowledgment that the issued token was received. For example, the fact that token-B is being provided in a request, and that the token being used (i.e., token-B) matches the unconfirmed token (i.e., token-B), the use of token-B can be treated as the acknowledgement. Thereafter, the token information can be updated in the persistent storage. For example, as shown in the column 'New Token Confirmed' of Table 1, confirmed token is updated to token-B, previous token is updated to token-A, and unconfirmed token is updated to NULL.

Figure 6:
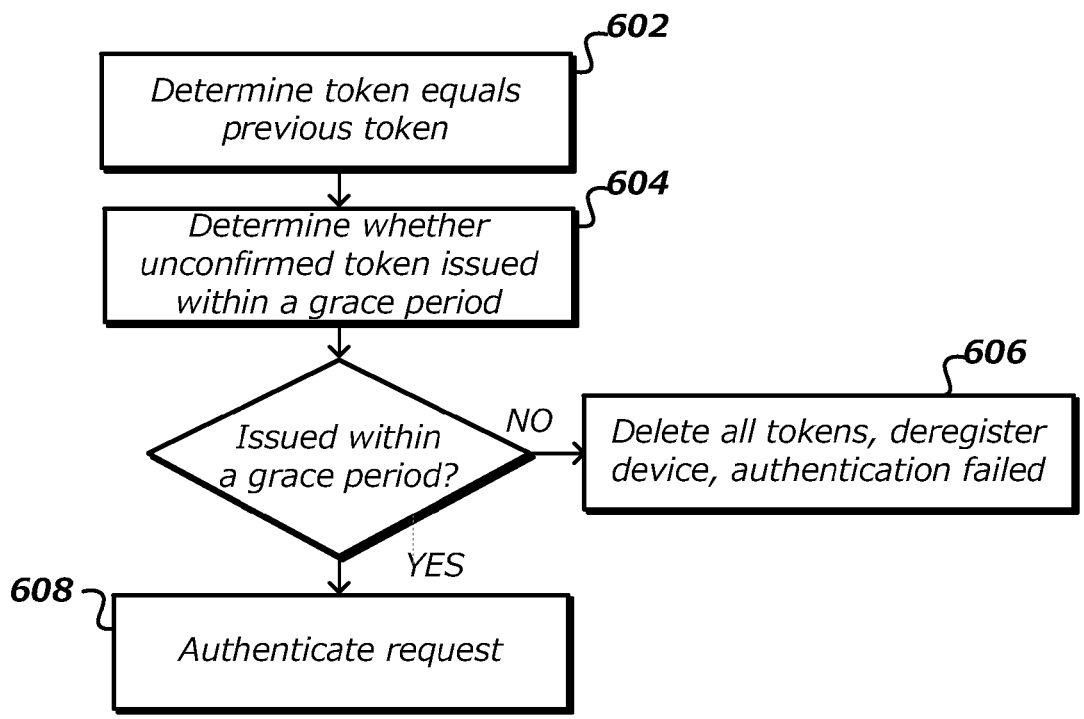
FIG. 6 illustrates an example process of using an old token after acknowledgment of a new token has been received, in accordance with an embodiment.

FIG. 6 illustrates an example process of using an old token after acknowledgment of a new token is received, in accordance with an embodiment. This can occur when a request from the client device arrives at the provider environment out-or-order, or when the client device has a buffer of outstanding requests waiting to be sent to the provider environment when the new token arrives at the client device. In any situation, when it is determined 602 that the token being used (e.g., token-A) matches the previous token (i.e., token-A), and it is determined 604 that the confirmed token (e.g., token-B) issued within a grace period (e.g., five minutes ago), the user (or device) can be authenticated 606 and the client device can access the one or more resources available through the provider environment. In the instance that confirmed token (e.g., token-B) issued greater than five minutes ago, the provider environment invalidates all tokens that exist for that user and/or client device, deregisters the client device, and authentication fails 608.

Figure 7:
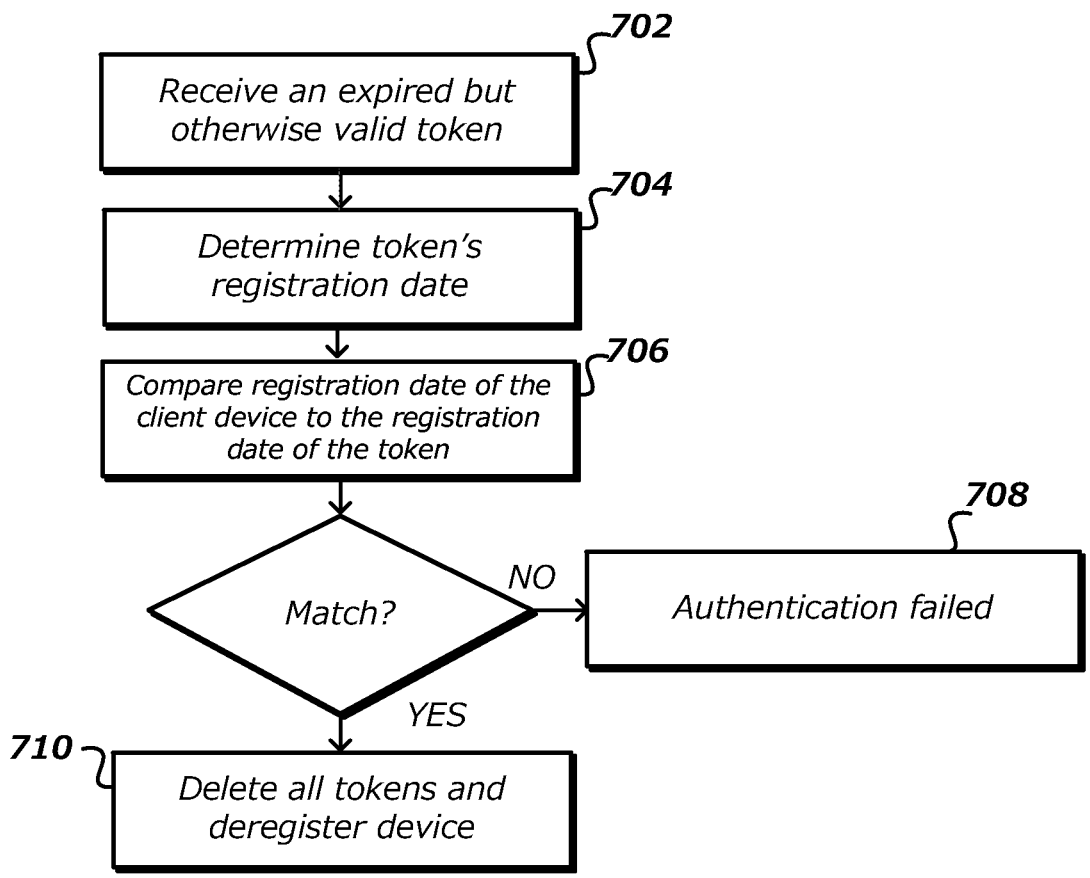
FIG. 7 illustrates an example process where an expired but otherwise valid token is received at a provider environment, in accordance with an embodiment.

FIG. 7 illustrates an example process where an unauthorized token is received at the provider environment, in accordance with an embodiment. For example, as described in step 510 of FIG. 5, all tokens that existed for the user and/or client device were invalidated. However, in some instances, an expired but otherwise valid token is received 702 at the provider environment where a user or a third party may attempt to use the token to authenticate into the system.

In one instance, the client device to which the token is associated with could be de-registered. However, de-registering the device would allow the malicious user with the token to continue to force de-registrations of the device by continually using the token. To avoid this problem, the device manager is queried to determine 704 the last time the client device registered with the device manager and the registration date of the token, and the registration date of the client device is compared 706 to the registration date of the token. If it is determined that the dates do not match, the token is expired, and the client device to which the token belonged has been de-registered sometime after the token was issued. Accordingly, in this situation, authentication fails 708. If the dates match, however, it cannot be determined that the client device had been deregistered. Accordingly, in this case, the provider environment invalidates all tokens that exist for that user and/or client device, deregisters the client device, and authentication fails 710.

Figure 8:
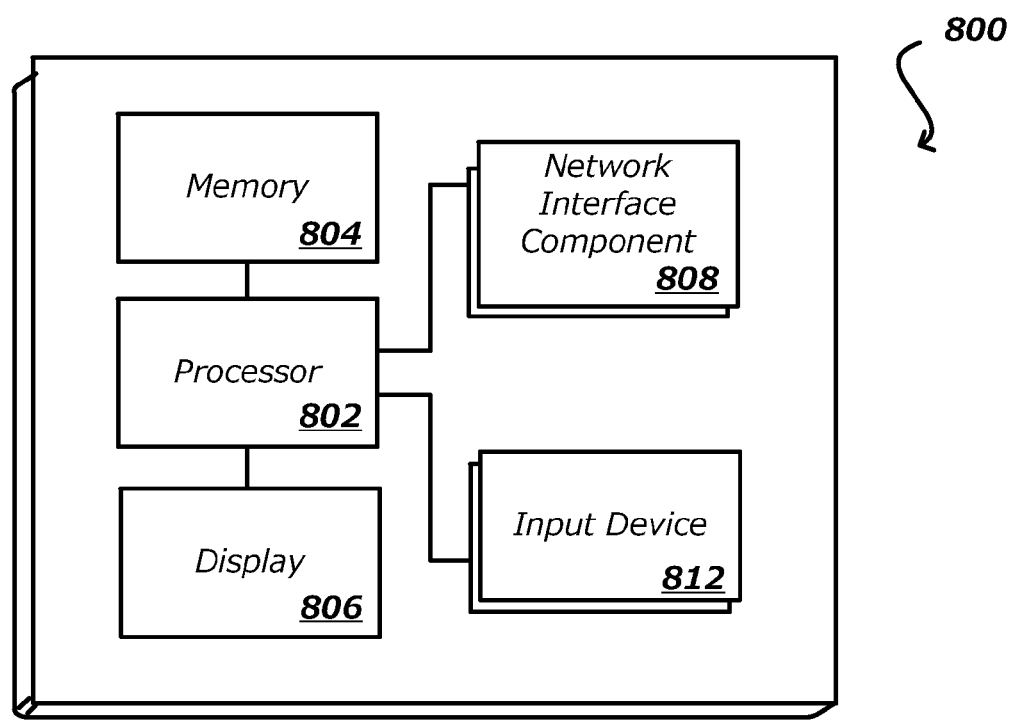
FIG. 8 illustrates a logical arrangement of a set of general components of an example client device that can be utilized in accordance with various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Figure 9:
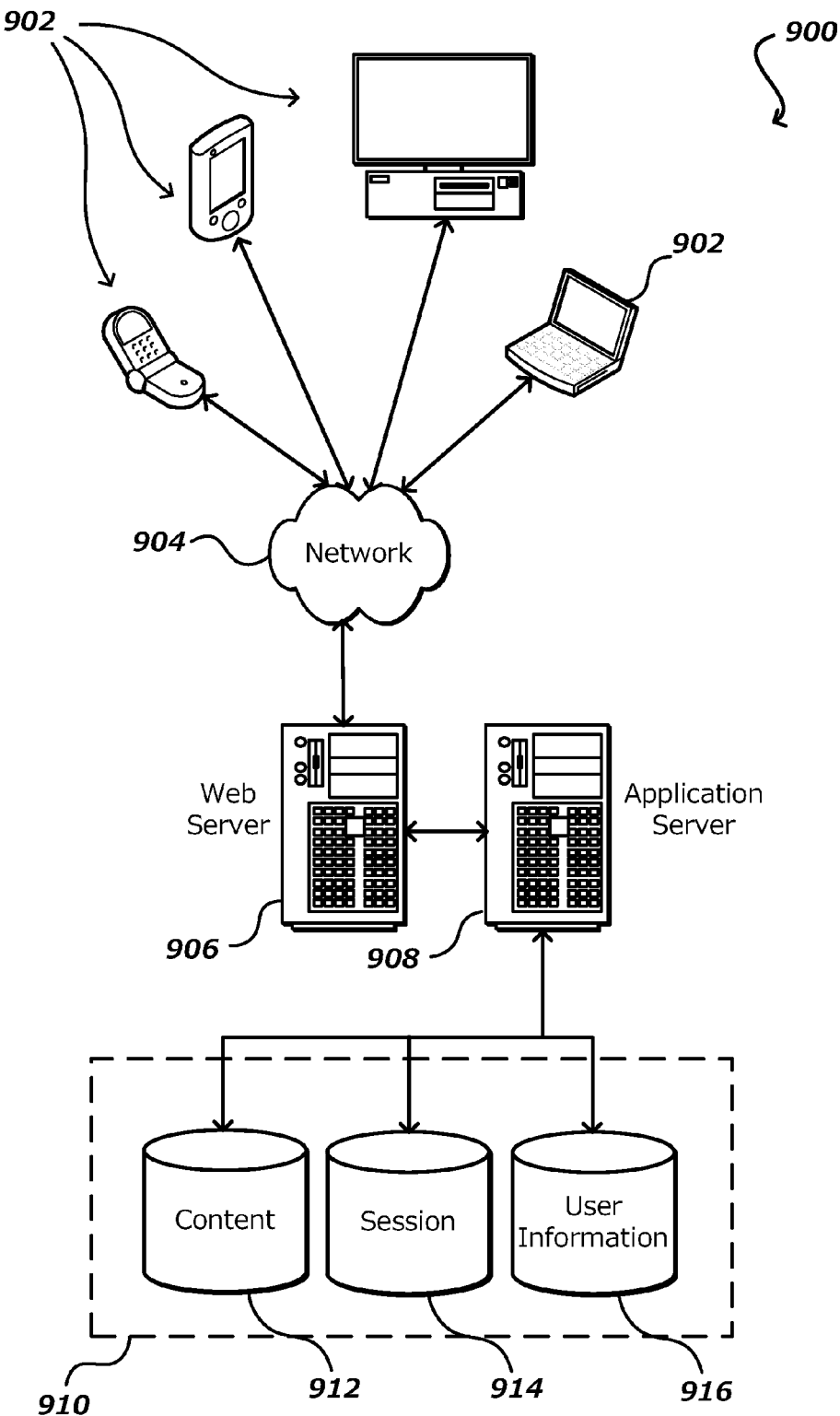
FIG. 9 illustrates an example of an environment for implementing aspects in accordance with various alternate embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for authenticating a user, comprising:
    under control of one or more computer systems configured with executable instructions,
        receiving an authentication request for at least one user operating a computing device registered with a provider environment, the authentication request including one or more credentials for at least one of the user or the computing device;
        in response to authenticating the at least one of the user or the computing device, providing a first token to the computing device for submission with a subsequent request;

receiving a subsequent request that includes the first token;
determining that the first token has expired;
determining based at least in part upon the first token and information for the at least one user that a second token has not previously been generated;
generating the second token;
providing the second token to the computing device for submission with one or more subsequent related requests;
receiving an acknowledgment that the second token was delivered to the computing device;
receiving a subsequent request that includes the first token that is a last confirmed token associated with the computing device;
determining that the acknowledgement is received before a predetermined time; and
authenticating the subsequent related request.

2. The computer implemented method of claim 1, further comprising:
maintaining state information for the first token and the second token, the state information indicating at least one of a token issued, a token confirmed, a previous token, or a token unconfirmed; and
wherein the state information for a token issued indicates that a token has been provided to the user, state information for a token confirmed indicates that the user has received a provided token, state information for a previous token indicates a previous token provided to the user, state information for a token unconfirmed indicates that the user has not acknowledged receipt of a provided token.

3. The computer implemented method of claim 2, further comprising:
determining that the second token has previously been generated by someone other than the at least one user based at least in part on state information for the first token and the second token, the first token being associated with a confirmed state and the second token being associated with at least an unconfirmed state; and
in response to determining that the second token has previously been generated, deleting all tokens associated with at least one of the at least one user or the computing device and deregistering the computing device from the provider environment to prevent access by the computing device to the provider environment.

4. A computer implemented method, comprising:
under the control of one or more computer systems configured with executable instructions,
receiving a request for a user operating a client device, the request including a first token that includes security information, the client device registered to a provider environment;
in response to determining that the first token is expired and includes valid security information, determining that a second token has not previously been generated;
generating the second token;
providing the second token to the client device for submission with one or more subsequent related requests;
receiving an acknowledgment that the second token was delivered to the client device;
receiving a subsequent request that includes the first token that is a last confirmed token associated with the client device;
determining that the acknowledgement is received before a predetermined time; and
authenticating the subsequent related request.

5. The computer implemented method of claim 4, further comprising:
maintaining state information for the first token and the second token, the state information indicating at least one of a token issued, a token confirmed, a previous token, or a token unconfirmed, wherein state information for a token issued indicates that a token has been provided to the user, state information for a token confirmed indicates that the user has received a provided token, state information for a previous token indicates a previous token provided to the user, state information for a token unconfirmed indicates that the user has not acknowledged receipt of a provided token.

6. The computer implemented method of claim 4, further comprising:
determining that the second token has previously been generated; and
deleting all tokens associated with at least one of the user or the client device and deregistering the client device from the provider environment to prevent access by the client device to the provider environment.

7. The computer implemented method of claim 4, further comprising:
receiving a subsequent request that includes the first token, the first token being confirmed;
determining that the subsequent request includes a confirmed token;
determining whether the second token has been provided to the client device, the second token being an unconfirmed token;
in response to determining that the second token has not been provided to the client device, authenticating the request; and
providing a new token to the client device.

8. The computer implemented method of claim 7, further comprising:
in response to determining that the unconfirmed token exists, determining that the unconfirmed token has not expired; and
authenticating the request.

9. The computer implemented method of claim 7, further comprising:
determining that the unconfirmed token has been provided to the client device;
determining that the unconfirmed token has expired;
determining that the confirmed token has expired; and
deleting all tokens associated with at least one of the user or the client device and deregistering the client device from the provider environment to prevent access by the client device to the provider environment.

10. The computer implemented method of claim 7, further comprising:
querying a device manager, the device manager maintaining status information related to the client device;
determining a status of the client device,
in response to determining an active status of the client device, providing a new token to the client device; and
updating a persistent storage to change at least one of information relating to a token issued entry, a token confirmed entry, a previous token entry, or a token unconfirmed entry.

11. The computer implemented method of claim 4, wherein
receiving a request including an unrecognized token;
determining a time the client device last registered with a device manager;
determining a time the unrecognized token issued; and denying authentication of the unrecognized token when the time the client device last registered is different from the time the unrecognized token issued.

12. The computer implemented method of claim 4, further comprising:
receiving, after generating the second token, a subsequent request including the first token; and
invalidating all tokens associated with at least one of the user or the client device, deregistering the client device from the provider environment to prevent access by the client device to the provider environment, and requiring the user to re-register the client device and/or re-authenticate by providing one or more credentials to access the provider environment.

13. The computer implemented method of claim 4, wherein determining that a token includes valid security information further comprises:
verifying a validity and integrity of a signature of the token before processing the request.

14. A computing system, comprising:
at least one processor; and
memory including instructions that, when executed by the at least one processor, cause the computing system to:
receive a request for a user operating a client device, the request including a first token that includes security information, the client device registered to a provider environment;
in response to determining that the first token is expired and includes valid security information, determine that a second token has not previously been generated;
generate the second token;
provide the second token to the client device for submission with one or more subsequent related requests;
receive an acknowledgment that the second token was delivered to the client device;
receive a subsequent request that includes the first token that is a last confirmed token associated with the client device;
determine that the acknowledgement is received before a predetermined time; and
authenticate the subsequent related request.

15. The computing system of claim 14, wherein the instructions, when executed, further cause the computing system to:
determine that the second token has previously been generated; and
delete all tokens associated with at least one of the user or the client device and deregistering the client device from the provider environment to prevent access by the client device to the provider environment.

16. The computing system of claim 14, wherein the instructions, when executed, further cause the computing system to:
receive a subsequent request that includes the first token, the first token being confirmed;
determine that the subsequent request includes a confirmed token;
determine whether the second token has been provided to the client device, the second token being an unconfirmed token;
in response to determining that the second token has not been provided to the client device, authenticate the request; and
provide a new token to the client device.

17. The computing system of claim 16, wherein the instructions, when executed, further cause the computing system to:
in response to determining that the unconfirmed token exists, determine that the unconfirmed token has not expired; and
authenticate the request.

18. The computing system of claim 16, wherein the instructions, when executed, further cause the computing system to:
determine that the unconfirmed token has been provided to the client device;
determine that the unconfirmed token has expired;
determine that the confirmed token has expired; and
delete all tokens associated with at least one of the user or the client device and deregistering the client device from the provider environment to prevent access by the client device to the provider environment.

19. The computing system of claim 17, wherein the instructions, when executed, further cause the computing system to:
query a device manager, the device manager maintaining status information related to the client device;
determine a status of the client device, in response to determining an active status of the client device, provide a new token to the client device; and
update a persistent storage to change at least one of information relating to a token issued entry, a token confirmed entry, a previous token entry, or a token unconfirmed entry.

20. A non-transitory computer readable storage medium storing one or more sequences of instructions executable by one or more processors to perform a set of operations comprising:
receiving a request for a user operating a client device, the request including a first token that includes security information, the client device registered to a provider environment;
in response to determining that the first token is expired and includes valid security information, determining that a second token has not previously been generated;
generating the second token;
providing the second token to the client device for submission with one or more subsequent related requests;
receiving an acknowledgment that the second token was delivered to the client device;
receiving a subsequent request that includes the first token that is a last confirmed token associated with the client device;
determining that the acknowledgement is received before a predetermined time; and
authenticating the subsequent related request.

21. The non-transitory computer readable storage medium of claim 20, wherein determining that a token includes valid security information further comprises:
verifying a validity and integrity of a signature of the token before processing the request.

22. The non-transitory computer readable storage medium of claim 20,
determining that the second token has previously been generated; and
deleting all tokens associated with at least one of the user or the client device and deregistering the client device from the provider environment to prevent access by the client device to the provider environment.

23. The non-transitory computer readable storage medium of claim 20, further comprising instructions executed by the one or more processors to perform the operations of:
receiving, after generating the second token, a subsequent request including the first token; and
invalidating all tokens associated with at least one of the user or the client device, deregistering the client device from the provider environment to prevent access by the client device to the provider environment, and forcing the user to re-register the client device and/or re-authenticate by providing one or more credentials.

24. The non-transitory computer readable storage medium of claim 20, further comprising instructions executed by the one or more processors to perform the operations of:
- receiving an acknowledgment that the second token was delivered to the client device;
- receiving a subsequent request that includes the first token, the first token being a last confirmed token associated with the client device;
- in response to determining that the first token is the last confirmed token, determining that the acknowledgement is received before a predetermined time; and
- authenticating the subsequent related request.

* * * * *